United States Patent Office

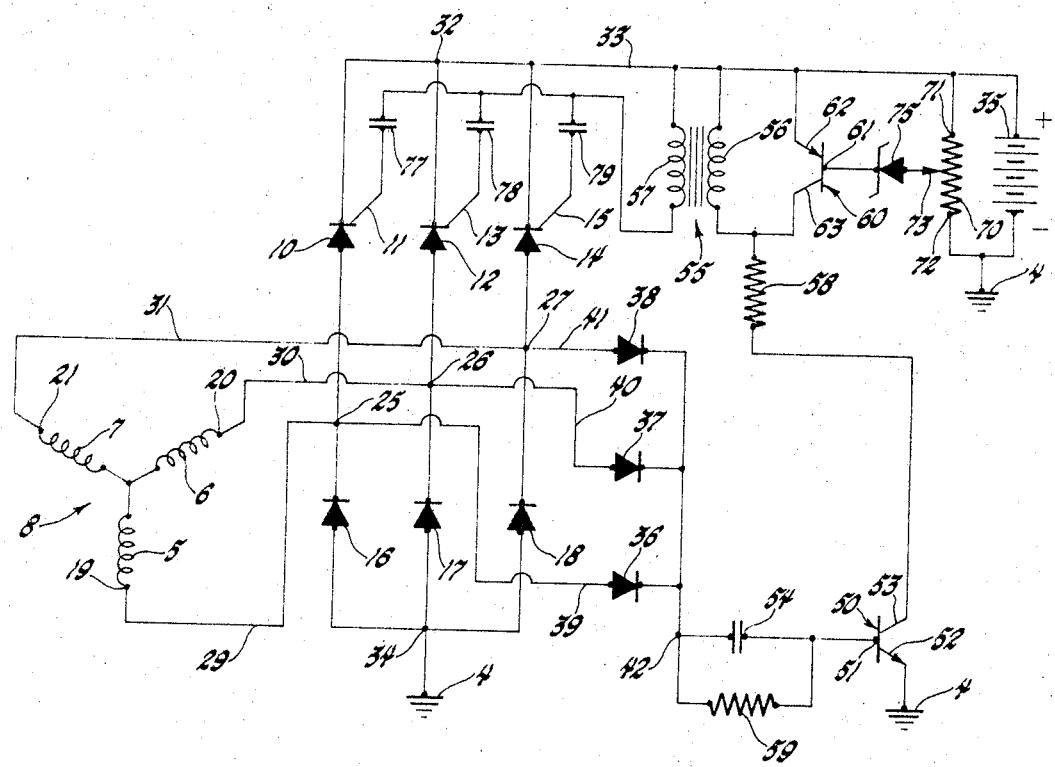

3,427,528
Patented Feb. 11, 1969

3,427,528
POTENTIAL REGULATOR CIRCUIT
Robert E. Custer, Anderson, Ind., assignor to General Motors Corporation, Detroit, Mich., a corporation of Delaware
Filed Sept. 14, 1966, Ser. No. 579,429
U.S. Cl. 321—18    1 Claim
Int. Cl. H02m *1/08, 7/52*

ABSTRACT OF THE DISCLOSURE

A potential regulator circuit for regulating the system potential of an electrical generating system employing an alternator and a bridge type rectifier circuit which has a silicon controlled rectifier corresponding to each phase of the alternator output potential in the positive polarity bank thereof. The alternator output potential is full wave rectified by an auxiliary rectifier circuit to produce the pulsating control signal for triggering the silicon controlled rectifiers conductive which is amplified by a single stage transistor amplifier and transformer coupled across the gate-cathode electrodes of all of the silicon controlled rectifiers, in parallel. Connected in shunt across the primary winding of the coupling transformer are the emitter-collector electrodes of another transistor for diverting the control signal from the gate-cathode electrodes of the silicon controlled rectifiers with output potentials exceeding a predetermined maximum which trigger this transistor conductive.

---

The present invention relates to potential regulator circuits and, more specifically, to a potential regular circuit suitable for use with permanent magnet type alternators.

With dynamoelectric machines which depend upon current flowing through a field coil or winding for producing the necessary magnetic field, it is a common expedient to alter the amount of current flowing through the field coil in response to changes of system potential magnitude for purposes of regulating the output potential of the machine. Permanent magnet type alternators, however, present a different regulating problem in that permanent magnet units provide the necessary magnetic field, therefore, machines of this type are not adaptable to potential regulator circuits or arrangements which operate to alter field coil current.

As alternators of the permanent magnet type offer certain advantages from the standpoint of cost and reliability over the field coil type, the requirement of a reliable and inexpensive potential regulator circuit or arrangement suitable for use with dynamoelectric machines of the permanent magnet type, is apparent.

It is, therefore, an object of this invention to provide an improved potential regulator circuit.

It is another object of this invention to provide an improved potential regulator circuit suitable for use with permanent magnet type alternators.

In accordance with this invention, a potential regulator circuit suitable for use with permanent magnet type alternators is provided in combination with a generating system rectifier circuit including at least one controllable unidirectional current translating device having two current carrying electrodes and a control electrode, of the type which may be triggered conductive upon the application of a control signal to the control electrode thereof, wherein a control signal normally applied to the control electrode of each controllable unidirectional current translating device including in the system rectifier circuit is diverted away from each control electrode by a potential sensitive circuit arrangement when the system potential exceeds a predetermined maximum.

For a better understanding of the present invention, together with additional objects, advantages and features thereof, reference is made to the following description and accompanying single figure drawing in which an embodiment of the regulator circuit of this invention is schematically set forth.

For purposes of illustrating the features of the novel regulating circuit of this invention and without intention or inference of a limitation thereto, the operation will be described in combination with a three phase permanent magnet type alternator. The alternating current output coils of a three phase permanent magnet type alternator are schematically illustrated in the figure as Y-connected stator coils 5, 6 and 7 which also may be connected in a delta configuration. A magnetic field produced by a permanent magnet or magnets, not shown, moves relative to these coils and generates a three phase potential therein in a manner well known in the art.

To convert the three phase alternating current potential generated in stator coils 5, 6 and 7 to a rectified direct current system potential, a rectifier circuit, generally shown at 8, is provided. In the figure, rectifier circuit 8 is illustrated as a three phase bridge type full-wave rectifier circuit having three controllable unidirectional current translating devices, each having two current carrying electrodes and a control electrode of the type which may be triggered conductive upon the application of a control signal of proper polarity to the control electrode thereof, in the positive polarity bank and three conventional unidirectional current translating devices in the negative polarity bank. Without intention or inference of a limitation thereto, the controllable unidirectional current translating devices have been illustrated in the figure as silicon controlled rectifiers 10, 12 and 14 having respective control electrodes 11, 13 and 15 and the conventional unidirectional current translating devices have been illustrated as conventional diodes 16, 17 and 18. It is to be specifically understood that alternate devices having similar electrical characteristics may be substituted for silicon controled rectifiers 10, 12 and 14 without departing from the spirit of the invention.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative. The silicon controlled rectifier may be triggered conductive upon the application to the control electrode of a control signal of a polarity which is positive with respect to the potential present upon the cathode electrode and of a sufficient magnitude to produce control electrode-cathode current. In the conducting state, the silicon controlled rectifier will conduct current in one direction and retains the ability to block current flow in the opposite direction. In the conducting state, therefore, the silicon controlled rectifier functions as a conventional diode. To extinguish a conducting silicon controlled rectifier, the anode-cathode circuit may be interrupted or the polarity of the potential applied across the anode-cathode electrodes may be reversed.

The alternating current potential generated in stator coils 5, 6 and 7 appears across the alternator alternating current output circuitry, which may be respective terminals 19, 20 and 21 or any other electrical device or arrangement which provides for an electrical connection to external circuitry. Stator coils 5, 6 and 7 are connected to respective alternating current input circuit terminals or junctions 25, 26 and 27 of rectifier circuit 8 through respective alternating current output circuit terminals 19, 20 and 21 and leads 29, 30 and 31.

The three phase alternating current potential generated in stator coils 5, 6 and 7 is full wave rectified by rectifier circuit 8 and appears as system potential across positive polarity junction 32 and negative polarity junction 34, which may be terminals or any other suitable electrical device or arrangement which provides for an electrical connection to external circuitry, of rectifier circuit 8. Positive polarity junction 32 may be connected to positive polarity line 33 and negative polarity junction 34 may be connected to point of reference or ground potential 4 which, since it is the same point electrically throughout the system, has been referenced by the same numeral throughout the figure. The system potential may be employed to charge a conventional storage battery 35 connected across the system output circuitry comprising positive polarity line 33 and point of reference or ground potential 4 and poled as shown.

To produce the control signal which may be applied to control electrodes 11, 13 and 15 of respective silicon controlled rectifiers 10, 12 and 14, at least a portion of the alternating current potential generated in stator coils 5, 6 and 7 may be rectified by an auxiliary rectifier circuit comprising diodes 36, 37 and 38 connected across the alternating current output terminals 19, 20 and 21 of the alternator through respective leads 39 and 29, 40 and 30 and 41 and 31 and the base-emitter junction of transistor 50. While the alternator is generating an alternating current potential, the control signal produced by this auxiliary rectifier circuit appears across junction 42 and point of reference or ground potential 4 as a positive potential signal which varies with alternator ripple. This control signal may be applied directly to the control electrodes 11, 13 and 15 of respective silicon controlled rectifiers 10, 12 and 14, however, with some applications, it may be necessary to amplify this signal.

One method for amplifying the control signal appearing at junction 42 and applying it to the control electrodes 11, 13 and 15 of respective silicon controlled rectifiers 10, 12 and 14 is through circuitry including a type NPN transistor 50, having the usual base 51, emitter 52 and collector 53 electrodes, and a pulse transformer 55, having a primary winding 56 and a secondary winding 57. An alternate transistor type may also be employed with compatible electrical polarities.

The primary winding 56 of pulse transformer 55 and the current carrying electrodes of transistor 50, collector electrode 53 and emitter electrode 52, are connected in series across the system output circuit between positive polarity line 33 and point of reference or ground potential 4. Resistor 58 is included in series in this circuit to provide protection for transistor 50 against high currents and transient potentials which may be of sufficient magnitude to destroy this device. The base electrode 51 of transistor 50 is connected to junction 42 through the parallel combination of a capacitor 54 and a resistor 59. Therefore, the control signal at junction 42 is applied across the base electrode 51 and one of the current carrying electrodes, emitter electrode 52, of transistor 50 through point of reference or ground potential 4.

As the collector electrode 53 of type NPN transistor 50 is connected to positive polarity line 33, through resistor 58 and primary winding 56 of pulse transformer 55, and the emitter electrode 52 thereof is connected to the negative polarity junction 34 of rectifier circuit 8, through point of reference or ground potential 4, this type NPN transistor is forward poled.

To divert the control potential signal away from the control electrode of each of the controllable unidirectional current translating devices included in the rectifier circuit when the system potential exceeds a predetermined maximum, a potential sensitive circuit arrangement connected across the system output circuitry is provided. This circuitry includes a type PNP transistor 60 having the usual base 61, emitter 62 and collector 63 electrodes, a variable impedance element, which may be a potentiometer 70 having two end terminals 71 and 72 and a movable contact 73, and a Zener diode 75. An alternate transistor type may also be employed with compatible electrical polarities.

The end terminals 71 and 72 of potentiometer 70 are connected across the system output circuitry between positive polarity line 33 and point of reference or ground potential 4, the current carrying electrodes, emitter electrode 62 and collector electrode 63, of transistor 60 are connected in shunt across the primary winding 56 of pulse transformer 55 and Zener diode 75 is connected between movable contact 73 of potentiometer 70 and base electrode 61 of transistor 60 and reverse poled.

As the emitter electrode 62 of type PNP transistor 60 is connected to positive polarity line 33 and the collector electrode 63 thereof is connected to the negative polarity junction 34 of rectifier circuit 8, through resistor 58, the collector-emitter electrodes of transistor 50 and point of reference or ground potential 4, this type PNP transistor is forward poled.

In operation, system potential appears across potentiometer 70 and a proportional amount of system potential, as determined by the setting of movable contact 73 of potentiometer 70, is applied, in a reverse polarity relationship, across Zener diode 75 through the emitter-base junction of transistor 60.

The maximum system potential, as determined by the external electrical circuitry or components with which the potential generating system is to be employed, is selected. Zener diode 75 is selected to have an inverse breakdown potential rating substantially equal to that proportion of the system potential which appears thereacross, as determined by the setting of movable contact 73 of potentiometer 70, with the system potential across potentiometer 70 being substantially equal to the selected predetermined maximum.

The regulating circuit arrangement of this invention regulates the system potential of generating systems employing permanent magnet type alternators in a manner now to be explained.

Assuming that the magnitude of the system potential appearing across positive polarity line 33 and point of reference or ground potential 4 remains substantially equal to or less than the selected predetermined maximum, Zener diode 75 remains nonconductive and interrupts the emitter-base circuit of transistor 60, therefore, this device is normally not conducting.

The positive polarity control signal appearing at junction 42, however, applied across the base 51 and emitter 52 electrodes of transistor 50 is of the proper polarity relationship to produce base-emitter current flow through a type NPN transistor, therefore, transistor 50 is normally conducting.

As the positive polarity control signal appearing at junction 42 varies with alternator ripple, these ripples are applied as a series of pulses through the secondary winding 57 of pulse transformer 55 and coupling capacitors 77, 78 and 79 to the control electrodes 11, 13 and 15 of respective silicon controlled rectifiers 10, 12 and 14.

As an alternating current potential is induced in each of stator coils 5, 6 and 7, the potential of the terminal end of each of these coils passes through positive and negative polarity excursions, with respect to point of reference or ground potential 4, during each induced alternating current potential cycle. With the presence of the control signal upon the control electrodes 11, 13 and 15 of respective silicon controlled rectifiers 10, 12 and 14, therefore, each of these devices is triggered conductive as it becomes forward poled during each positive polarity excursion of the potential of the terminal end of the corresponding stator coil and is extinguished as it becomes reverse poled during each negative polarity excursion of the potential of the terminal end of the corresponding stator coil.

While silicon controlled rectifiers 10, 12 and 14 are triggered conductive by the control signal as each becomes forward poled during each positive polarity excursion of the potential of the terminal end of the corresponding stator coil, the alternating current potential generated in stator coils, 5, 6 and 7 is full-wave rectified and appears as a direct current system potential across the output circuitry of the system.

Should the magnitude of the system potential appearing across positive polarity line 33 and point of reference or ground potential 4 increase above the selected predetermined maximum, Zener diode 75 breaks down and conducts in a reverse direction to complete a circuit for the flow of current through the emitter-base junction of type PNP transistor 60, thereby triggering this device to conduction. With transistor 60 conducting, the control signal is diverted away from the control electrodes 11, 13 and 15 of respective silicon controlled rectifiers 10, 12 and 14.

With the control signal diverted by conducting transistor 60, silicon controlled rectifiers 10, 12 and 14 are not re-triggered conductive during the succeeding positive polarity excursions of the potential of the terminal end of each corresponding stator coil. With these conditions, the system potential appearing across positive polarity line 33 and point of reference or ground potential 4 decreases in magnitude.

When the magnitude of the system potential has decreased below the selected predetermined maximum, Zener diode 75 ceases to conduct, thereby interrupting the circuit which provides emitter-base current flow through transistor 60, a condition which quickly extinguishes this device. With transistor 60 extinguished, the control potential signal is again applied to the control electrodes 11, 13 and 15 of respective silicon controlled rectifiers 10, 12 and 14, in a manner previously explained, and the system again operates in the normal manner.

This invention has been described in reference to the full wave rectification of a three phase alternating current potential generated by a permanent magnet type alternator. It is to be specifically understood that the novel circuit of this invention is equally applicable for use with field coil type alternators and with full or half-wave rectification of more or less alternating current phases and is not to be construed as limited to the specific embodiment set forth in the figure. With half-wave rectification, of course, fewer unidirectional current translating devices are required in the rectifier circuitry and with more or less phases, more or less unidirectional current translating devices may be required. In fact, the regulating arrangement of this invention may be employed with a half-wave rectifier circuit employing only a single controllable unidirectional current translating device having electrical characteristics similar to that of the silicon controlled rectifier illustrated in the figure.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A potential regulator circuit for regulating the system potential of an electrical generating system employing an alternator having alternating current output circuit means comprising, a rectifier circuit including at least one silicon controlled rectifier having two current carrying electrodes and a control electrode for rectifying the output potential of said alternator, system output circuit means across which system potential appears, a first transistor having two current carrying electrodes and a control electrode, a transformer having primary and secondary windings, means for connecting said primary winding of said transformer and said current carrying electrodes of said first transistor in series across said system output circuit means, means for connecting said secondary winding of said transformer across said control electrode and one of said current carrying electrodes of each of said silicon controlled rectifiers including in said rectifier circuit, an auxiliary rectifier circuit for producing a control signal, means for connecting said auxiliary rectifier circuit across said alternating current output circuit means, means for applying said control signal across the said base electrode and one of said current carrying electrodes of said first transistor, a second transistor having two current carrying electrodes and a control electrode, a variable impedance element having two end terminals and a movable contact, a Zener diode, means for connecting said variable impedance element across said system output circuit means, means for connecting said current carrying electrodes of said second transistor in shunt across said primary winding of said transformer and means for connecting said Zener diode between said movable contact of said variable impedance element and said control electrode of said second transistor.

References Cited

UNITED STATES PATENTS

| | | | |
|---|---|---|---|
| 3,009,091 | 11/1961 | Hallidy | 322—28 |
| 3,300,704 | 1/1967 | McMillen | 320—61 |
| 3,304,486 | 2/1967 | Michaels. | |
| 3,315,141 | 4/1967 | Wright et al. | 322—28 XR |

JOHN F. COUCH, *Primary Examiner.*

W. M. SHOOP, *Assistant Examiner.*

U.S. Cl. X.R.

320—40; 322—28